Dec. 20, 1966 F. W. GUTZWILLER 3,293,449

SOLID STATE THYRATRON REPLACEMENT

Filed June 24, 1963 3 Sheets-Sheet 1

INVENTOR:
FRANK W. GUTZWILLER,
BY Urban H. Faubion
HIS ATTORNEY.

Dec. 20, 1966 F. W. GUTZWILLER 3,293,449

SOLID STATE THYRATRON REPLACEMENT

Filed June 24, 1963 3 Sheets-Sheet 2

INVENTOR:
FRANK W. GUTZWILLER,

BY [signature]

HIS ATTORNEY.

SOLID STATE THYRATRON REPLACEMENT
Filed June 24, 1963 3 Sheets-Sheet 3
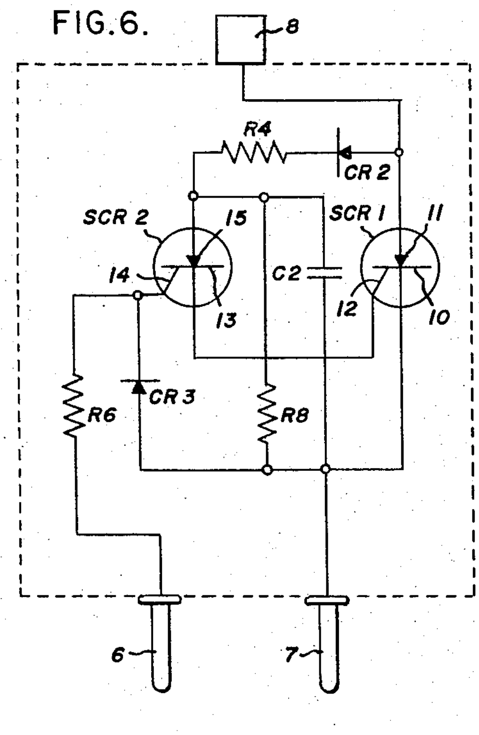
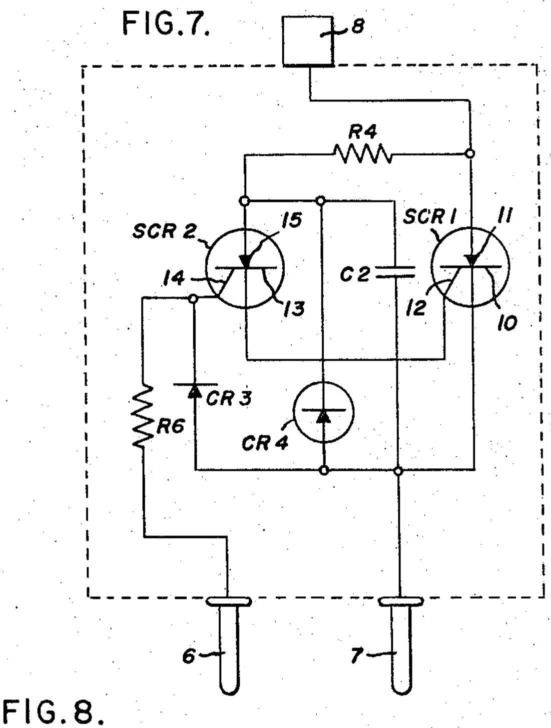
FIG. 8.
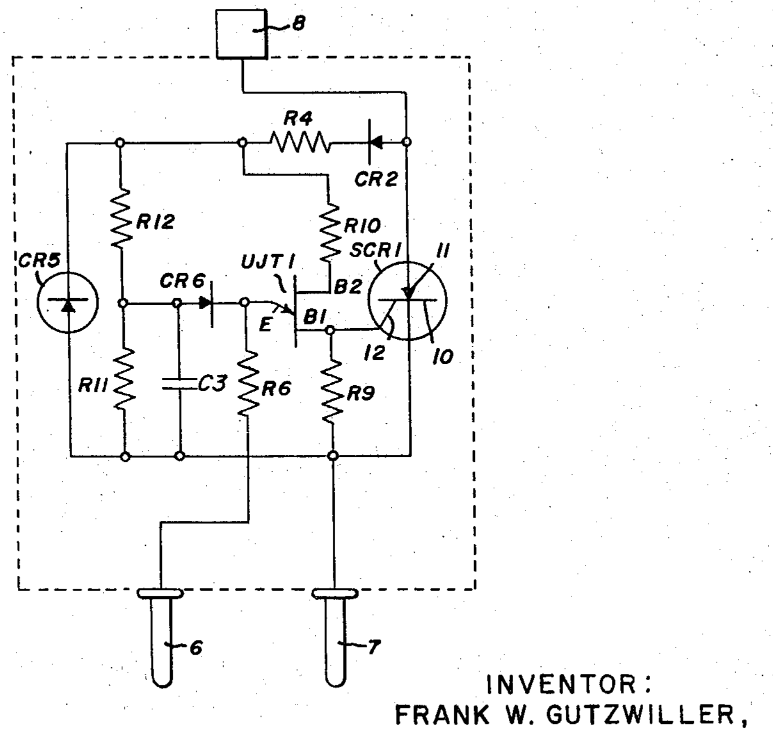
INVENTOR:
FRANK W. GUTZWILLER,
BY Urban H. Faubion
HIS ATTORNEY.

United States Patent Office 3,293,449

Patented Dec. 20, 1966

3,293,449
SOLID STATE THYRATRON REPLACEMENT

Frank W. Gutzwiller, Auburn, N.Y., assignor to General Electric Company, a corporation of New York Filed June 24, 1963, Ser. No. 289,989
16 Claims. (Cl. 307—88.5)

The present invention relates to a solid state switching apparatus and more specifically, to such an apparatus which can be utilized in a circuit as a direct substitute for switching electron vacuum tube, particularly of the type generally known as a thyraton.

The invention contemplates the use of a three terminal solid state switch such as the silicon controlled rectifier. Such a switch has an anode and cathode which, like an electron tube, provides the main current path through the device. Also like an electron tube, conventional current flow through the device is in one direction from anode to cathode. Further, like a thyratron tube, the controlled rectifier is provided with a gate or switching control terminal (gate lead) which switches the device from its high to its low impedance state in response to a gate signal. Although the silicon controlled rectifier has been designated from its inception as the "solid state thyratron" because of the analogous functions performed by the two components, the SCR cannot be utilized as a direct replacement for a thyratron without extensive circuit changes. Since the grid of a thyraton presents a very high input impedance, a low power signal can be utilized for firing in countradistinction to an SCR which presents a relatively low gate impedance thereby necessitating a considerably higher power signal for firing. Because of this difference in the input characteristics of the two devices, prior art silicon controlled rectifier switching devices have not been capable of utilization as direct replacements for thyratrons.

Accordingly, an object of the present invention is to provide a solid state switching apparatus suitable for direct replacement of a thyratron tube.

Another object is to provide a solid state switching apparatus having electrical characteristics similar to those of a thyratron.

Still another object is to provide a solid state plug-in replacement for a thyratron which is compatible with conventional thyratron hardware.

These and other objects are achieved in one embodiment of the invention through the use of a low power SCR or unijunction transistor having an input impedance of the order of that of a thyratron to trigger a high-power SCR having a relatively low input impedance. These semiconductor elements and associated circuit elements are placed in an envelope structure provided with terminal pins (and anode cap where applicable) which may be directly inserted into the tube socket of the thyratron being replaced.

Figure 1:
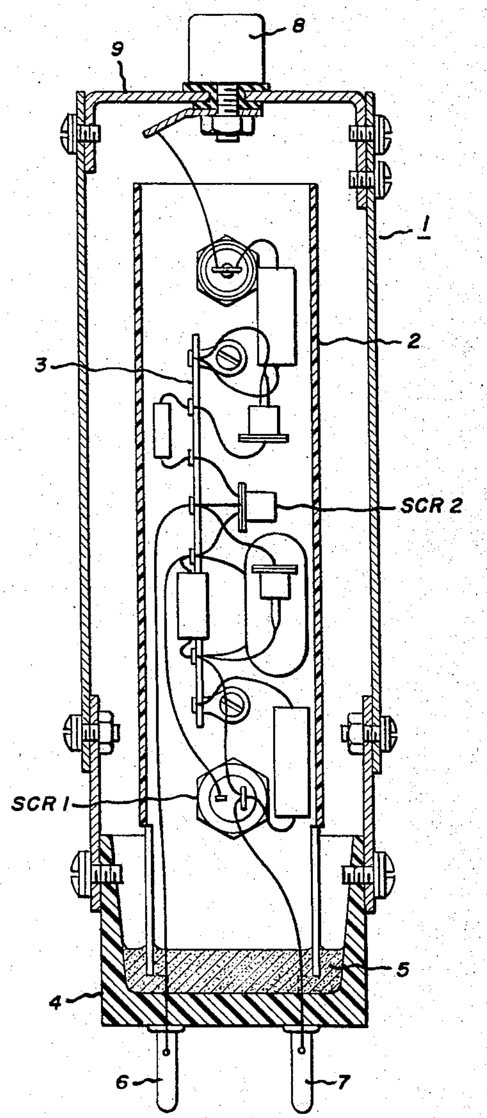
Figure 2:
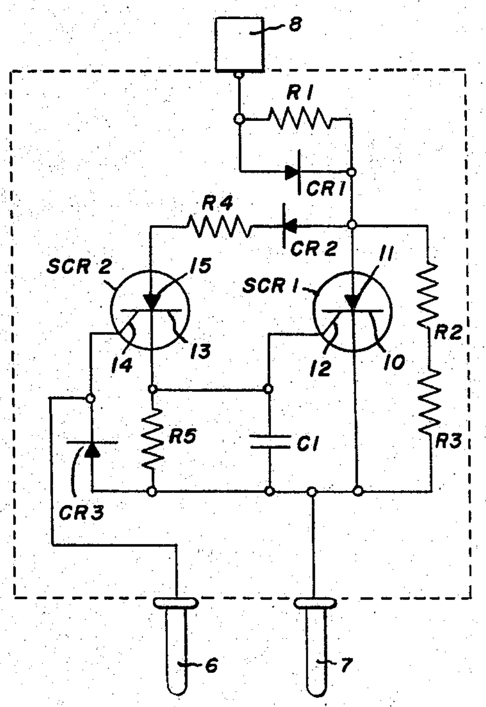

The novel and distinctive features of the invention are set forth in the appended claims. The invention itself together with further objects and advantages thereof may best be understood by reference to the following description and accompanying drawings in which:

FIGURE 1 is a cross-sectional view of a representative envelope structure of this invention, FIGURE 2 depicts in schematic form solid state switching apparatus of this invention; and FIGURES 3 through 8 inclusive show schematically other embodiments of the solid state switching apparatus of this invention.

Referring specifically to FIGURE 1, there is shown a representative structure for a solid state switching apparatus suitable for plug-in replacement of a thyratron. The assembly comprises a first silicon controlled rectifier SCR1 having a high power handling capability which is triggered by a second low power silicon controlled rectifier SCR2 which has a gate impedance of the order of the grid impedance of the thyratron to be replaced. SCR1 and SCR2 are mounted within envelope 1 along with associated circuit elements, the elements being mounted on a channel member 2 through the use of terminal board 3. The envelope 1 is provided with a base member 4 in which the channel member 2 is affixed through the use of a potting material 5. Terminal pins 6 and 7 are provided in the base member 4, the pins 6 and 7 being electrically connected to the gate of SCR2 and the cathode of SCR1 respectively and corresponding directly to the grid and cathode pins respectively of the thyratron being replaced. An anode cap or connector 8 (also considered a terminal pin for purposes of description and claim langauge) is provided at the opposite end of the assembly and is affixed to the envelope 1 through the use of bracket member 9. Electrical connection is effected to the anode of SCR1 so that anode connector 8 corresponds directly to the anode terminal of the thyratron being replaced. The base member 4 may further be provided with dummy terminal pins to be received by the apertures in the thyratron socket which are utilized to provide filament connections to the thyratron. Thus, a compact, integrated assembly is provided which is completely compatible with the conventional thyratron hardware.

It should be appreciated that although an embodiment has been shown wherein an anode cap is utilized as employed in relatively high voltage devices, other conventional arrangements might be utilized such as are employed in lower voltage thyratons wherein the anode terminal extends from the base of the assembly in a manner similar to the grid and cathode terminals.

Referring to FIGURE 2, there is shown in schematic form one embodiment of a circuit suitable for incorporation in the assembly of FIGURE 1 to provide direct replacement of a thyratron. In fact, the circuit of FIGURE 2 is the circuit utilized in the assembly of FIGURE 1 and corresponding elements in the two figures are given the same reference numerals. SCR1 is a high power SCR having equivalent power handling capabilities to that of the thyratron being replaced. Cathode 10 and anode 11 of SCR1 are connected between the device cathode terminal 7 and anode terminal 8 respectively as depicted in the assembly of FIGURE 1. Note that the arrow of the symbol for controlled rectifiers and diodes points in the direction of normal conventional current flow through the device. Thus, normal current flow through SCR1 is from assembly anode cap 8 to cathode pin 7. A blocking diode CR1 is provided between the anode 11 of SCR1 and the device anode cap 8 and poled to conduct current in the same direction as SCR1 in order to increase the reverse voltage withholding capability of the device. This may be necessary in circuits where high reverse voltages are likely to occur. Proper apportionment of voltage between the limiting rectifier CR1 and controlled rectifier SCR1 respectively is assured by connecting a resistor R1 around (in parallel with) the rectifier CR1 and the series combination of resistors R2 and R3 in parallel with SCR1. This arrangement of resistors (R1, R2 and R3) acts as a voltage divider between the assembly cathode terminals and anode 7 and 8 respectively.

The triggering electrode, gate 12, of SCR1 is connected to the cathode 13 of a low power silicon controlled rectifier SCR2 which has a highly sensitive gate 14. This controlled rectifier SCR2 may be, for example, the commercially available type C5D. The particular rectifier is selected for its sensitivity and its input impedance. The anode 15 of SCR2 is connected to the tube anode terminal 8 through a suitable current limiting resistance R4, blocking diode CR2 and the previously described parallel combination of blocking diode CR1 and resistance R1. The blocking diode CR2 and SCR2 are connected to conduct current in the same direction and away from assembly anode cap 8 just as diode CR1 and SCR1 do. Blocking diode CR2 provides additional reverse voltage protection for SCR2.

In order to prevent spurious firing of SCR1 by leakage current through SCR2 and to limit transient voltages between its gate 12 and cathode 10 the anode-cathode circuit for SCR2 is completed by the parallel combination of resistance R5 and capacitance C1 which are connected between the cathode terminal 13 of SCR2 and the tube cathode electrode 7. The capacitor C1 provides a bypass for transients and thereby limits the voltage which can be applied between the gate 12 and cathode 13 of SCR1. Resistance R5 provides a current path (device anode 8 to cathode 7) for leakage currents through SCR2. A direct connection is provided between gate 14 of SCR2 and assembly terminal pin 6. Although not used in this particular circuit, many applications require a current limiting resistor in the gate 14 to terminal pin 6 connection. In order to prevent a voltage which is negative (relative to the cathode of SCR2) from being applied to the gate 14, a diode CR3 is connected between the assembly cathode and gate terminal pins 7 and 6 respectively. The polarity of diode CR3 is such that it conducts when the gate 14 is negative relative to cathode 13.

The use of SCR2 in this manner, while serving to increase grid signal sensitivity and input impedance, also serves to reduce the holding current necessary in the load for successful operation to thereby allow use of the switching apparatus under very light load.

In the solid state switching apparatus as described, the operation is such that if a positive signal, such as is utilized to fire the thyratron being replaced, is applied to the "grid" in 6, SCR2 will fire. When SCR2 fires current flows through the circuit from anode cap 8 through R1 and CR1, CR2, R4, SCR2 and R5 to cathode pin 7. Thus a voltage is developed across resistor R5 which appears directly between gate 12 and cathode 10 of SCR1 and current flows between these electrodes. In this manner, SCR1 is fired by the conventional thyratron input signal.

Thus, a semiconductor switching apparatus is provided which serves as a plug-in replacement for a thyratron while at the same time eliminating the undesirable characteristics of a thyratron such as the requirement for filament power, fragility, and a relatively high forward voltage drop. Further, such an apparatus will exhibit a much greater reliability and longer life than the equivalent thyratron.

A similar action and function is provided by the other circuits illustrated and described here. In order to simplify the description and drawings, components of the figures which correspond are given like reference numerals.

Figure 3:
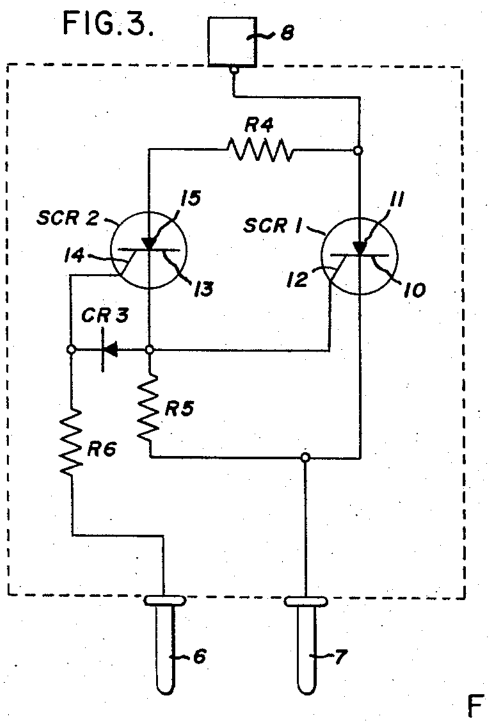

Again in the circuit of FIGURE 3 the main power handling controlled rectifier SCR1 is selected to have equivalent power handling capabilities to that of the thyratron being replaced. Cathode 10 and anode 11 of SCR1 are connected to cathode terminal 7 and anode terminal 8 respectively in such a manner that normal conventional current flow is from anode terminal 8 to cathode terminal 7. The gate 12 of SCR1 is connected to the cathode 13 of low power silicon controlled rectifier SCR2 which has a highly sensitive gate 14. SCR2 again may be, for example, the commercially available C5D type. The anode 15 of SCR2 is connected through the current limiting resistance R4 to the anode 11 of SCR1, while the cathode of SCR2 is again connected to the cathode 10 of SCR1 through leakage current passing resistance R5. The gate 14 of SCR2 is connected through a suitable current limiting resistance R6 to the terminal pin 6 of the assembly. The cathode and anode of protective diode CR3 are connected to the gate and cathode respectively of SCR2 in order to prevent a negative voltage from appearing thereon.

The principal differences between the circuits of FIGURES 2 and 3 are that SCR1 does not have the protective resistance bridge (R1, R2 and R3) and blocking diode CR1. Also, in the circuit of FIGURE 3 the gate protecting diode CR3 is connected directly between the gate 14 and cathode 13 of SCR2 instead of between the gate 14 and cathode 13 through resistor R5 as in FIGURE 2.

Figure 4:
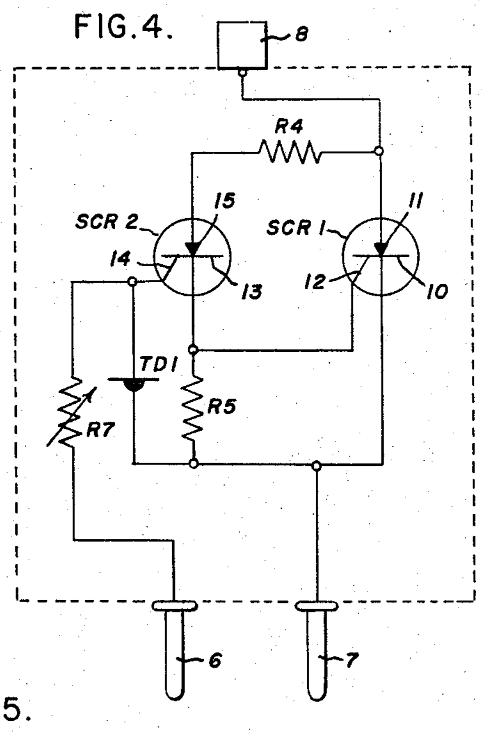

Referring to FIGURE 4, there is shown schematically a modification of the circuit shown in FIGURE 3 wherein a tunnel diode is employed to insure a consistent, nontemperature dependent firing point. The reference numerals of elements of FIGURE 4 common to FIGURE 3 are identical. A tunnel diode TD1 has its anode connected to the gate 14 of SCR2 and its cathode connected to the cathode 10 of SCR1. A variable resistance R7 is connected between the terminal pin 6 and the gate 14 of SCR2 in such a manner that the firing point of SCR2 and the input impedance can be adjusted by R7 and the required "grid" signal can be increased to a relatively high positive value by proper selection of TD1. Aside from the variable feature, R7 performs the same function as did R6 in the circuit of FIGURE 3. A repeatable firing point is achieved. Until the current through R7 and TD1 reaches the peak current of TD1 and the tunnel diode switches to its high impedance state, the current is shunted around the gate of SCR2. When TD1 switches, the voltage level at the gate of SCR2 is raised, thereby causing firing.

Figure 5:
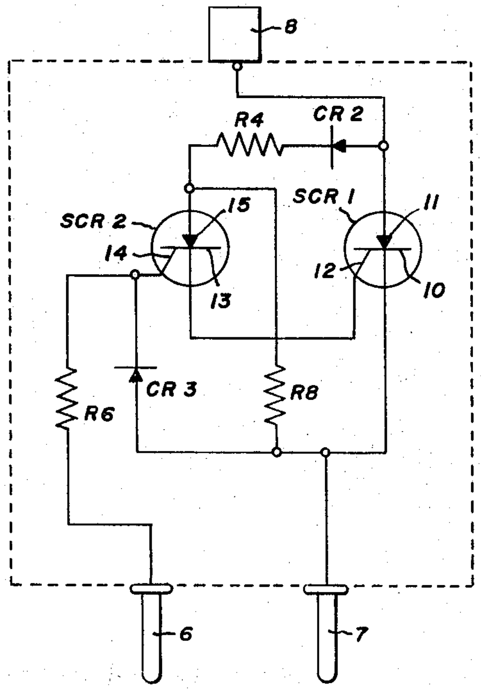

Referring to FIGURE 5, there is shown another circuit modification which in many respects resembles the circuit of FIGURE 2. Again, circuit elements which correspond to circuit elements of previous circuits are given identical reference characters in order to simplify the description and drawings. This circuit employs a voltage divider to lower the voltage at the anode of SCR2. In order to accomplish this, resistance R8 is connected between the anode 15 of SCR2 and the cathode 10 of SCR1 so that the resistance R8 with resistance R4 forms a voltage divider to step down the voltage at the anode 15 of SCR2 to a lower level than that present on the anode 11 of SCR1. Thus, an SCR having a lower voltage rating than that required in the circuit of either FIGURE 2 or FIGURE 3 can be utilized for SCR2. Like the circuit of FIGURE 2, a diode CR3 has its cathode connected to the gate 14 of SCR2 and its anode connected to the cathode 10 of SCR1 in order to prevent the gate of SCR2 from going negative. Also as in the circuit of FIGURE 2, diode CR2 is connected between resistance R4 and the anode connector 8. In this circuit, diode CR3 also prevents reverse current flow through the divider formed by resistances R4 and R8.

Referring to FIGURE 6, there is shown a modification of the circuit of FIGURE 5, which is identical to the circuit of that figure except for the addition of a capacitor C2 to minimize standby losses. Like reference numerals are utilized for common elements. Capacitor C2 is connected in shunt with resistance R8 in order to store energy when SCR2 is turned off, the stored energy being discharged through SCR2 to the gate 12 of SCR1 when SCR2 is fired. Through the use of C2 in this manner the resistance of R4 and R8 can be increased, thereby to minimize standby losses.

Referring to FIGURE 7 there is shown a modification of the circuit of FIGURE 6 employing a Zener diode in place of the resistance R8 to lower the voltage at the anode 15 of SCR2. Zener diode CR4 has its cathode connected to the anode 15 of SCR2 and its anode connected to the cathode 10 of SCR1. In this manner CR4 serves to limit the voltage at the anode of SCR2 thereby serving a similar function to the resistance R8 of FIGURE 5 while at the same time eliminating the necessity of diode CR2.

Referring to FIGURE 8, another circuit modification is depicted wherein SCR2 of FIGURES 2 and 3 is replaced by unijunction transistor UJT1, elements common to the figures again being referenced by like numerals. The first base B1 of UJT1 is connected through resistance R9 to the cathode 10 of SCR1 while the second base B2 of UJT1 is connected through resistance R10 to the low side of resistance R4. Resistance R6 is connected between the "grid" pin 6 and the emitter E of UJT1. A reference voltage is provided by a voltage divider comprised of resistances R11 and R12 connected between the cathode 10 of SCR1 and the low side of resistance R4. A bias defining Zener diode CR5 has its anode and cathode connected to the cathode of SCR1 and the low side of resistance R4 respectively. The mid-point of the voltage divider formed by resistances R11 and R12 is connected to the anode of diode CR6, the cathode of which is connected to the emitter of UJT1, diode CR6 blocks reverse current flow. Capacitor C3 is connected from the mid-point of the divider formed by resistance R11 and R12 to the cathode 10 of SCR1. The function of capacitor C3 is to hold the voltage at the emitter of UJT1 at a point just below the firing voltage. A diode CR2 is connected between resistance R4 and the anode connector 8 to prevent reverse current flow.

In the circuit of FIGURE 8, the operation is such that the Zener diode CR5 provides a D.C. bias across the unijunction transistor UJT1 and a reference voltage across the voltage divider comprised of resistances R11 and R12. The values of R11 and R12 are chosen so that the voltage at the midpoint of the divider will charge the capacitor C3 to a voltage just below the emitter voltage necessary for firing of the unijunction transistor. When the signal at the terminal pin 6 rises to the voltage level necessary to fire UJT1, the capacitor is discharged into the gate 12 of SCR1 to cause firing of SCR1. Through the use of capacitor C3 in conjunction with a suitable unijunction transistor in this manner, a very high gate sensitivity s realized.

Although the invention has been described with respect to certain specific embodiments, it will be appreciated that modifications and changes may be made by those skilled in the art without departing from the spirit of the invention. Therefore, it is intended by the appended claims to cover all such modifications and changes that fall within the true spirit and scope of the invention.

What we claim as new and desire to secure by Letters Patent of the United States is:

1. A solid state switching apparatus capable of being utilized in a circuit as a direct substitute for a thyratron, said apparatus comprising:

(a) an envelope structure provided with at least first, second, and third terminal pins adapted to be received by conventional thyratron receiving socket terminals and corresponding directly to the anode, cathode, and control grid terminal pins respectively of the thyratron, (b) a silicon controlled rectifier mounted within said envelope and having relatively high power handling capability and relatively low input impedance with respect to the thyratron, (i) said controlled rectifier having anode, cathode, and gate electrodes, (c) a semiconductor voltage-controlled breakdown device mounted within said envelope and having relatively low power handling capability and relatively high input impedance with respect to said controlled rectifier, (i) said breakdown device having first, second, and third electrodes, (ii) said first electrode serving to initiate a breakdown of said breakdown device, (d) said second and third electrodes of said breakdown device being coupled to said anode and gate electrode respectively of said controlled rectifier, (e) said anode and cathode electrodes of said controlled rectifier being coupled to said first and second terminals respectively of said envelope structure, and (f) said first electrode of said breakdown device being coupled to said third terminal of said envelope structure.

2. A solid state switching apparatus as defined in claim 1 wherein said voltage-controlled breakdown device is a second silicon controlled rectifier and wherein, (a) said first, second, and third electrodes of said breakdown device are the gate, anode, and cathode electrodes respectively of said second silicon controlled rectifier.

3. The solid state switching apparatus as defined in claim 1 wherein said voltage-controlled breakdown device is a unijunction transistor having an emitter and first and second base electrodes, (a) said first electrode of said breakdown device being said emitter of said unijunction transistor, and (b) said second and third electrodes of said breakdown device being said first and second base electrodes of said unijunction transistor.

4. The solid state switching apparatus as defined in claim 3 having a voltage divider connected between said anode and cathode of said silicon controlled rectifier and having a capacitor connected between an intermediate point on said voltage divider and the cathode of said controlled rectifier, said intermediate point of said voltage divider being connected to the emitter electrode of said unijunction transistor.

5. The solid state switching apparatus as defined in claim 2 including a tunnel diode, said tunnel diode having its anode connected to the gate electrode of said second controlled rectifier and having its cathode connected to the said cathode of said first silicon controlled rectifier.

6. The solid state switching apparatus as defined in claim 2 having a voltage divider connected between said anode and cathode of said first silicon controlled rectifier, said anode of said second silicon controlled rectifier being connected to an intermediate point on said voltage divider.

7. The solid state switching apparatus as defined in claim 6 having a capacitor connected between said intermediate point of said voltage divider and said cathode of said first silicon controlled rectifier.

8. The solid state switching apparatus as defined in claim 2 including a Zener diode having its anode connected to the cathode of said first controlled rectifier and its cathode connected to the anode of said second controlled rectifier.

9. A solid state switching apparatus for direct substitution in a circuit for a switching electron tube, said apparatus comprising:

(a) an envelope structure provided with at least three electrode terminal pins adapted to be received by conventional tube socket terminals and corresponding directly to terminals of the tube replaced, (b) a silicon controlled rectifier having relatively high power handling capability and relatively low input impedance with respect to the electron tube, (i) said controlled rectifier having anode, cathode, and gate electrodes, (c) a semiconductor voltage-controlled two-state switching device capable of being switched between a high impedance condition and a low impedance condition and having relatively low power handling capability and relatively high input impedance with respect to said controlled rectifier, (i) said switching device having first, second and third electrodes, (ii) said first electrode serving to switch said switching device, (d) said second and third electrodes of said switching device being coupled to said anode and gate electrode respectively of said controlled rectifier, (e) said anode and cathode electrodes of said controlled rectifier coupled between first and second terminals respectively of the three terminals in the circuit and said first electrode of said switching device being coupled to the third circuit terminal.

10. A solid state switching apparatus as defined in claim 9 wherein said voltage controlled switching device is a second silicon controlled rectifier and wherein (a) said first, second and third electrodes of said switching device are the gate anode and cathode electrodes respectively of said second silicon controlled rectifier.

11. The solid state switching apparatus as defined in claim 9 wherein said voltage controlled switching device is a unijunction transistor having an emitter and first and second base electrodes, (a) said first electrode of said switching device being said emitter of said unijunction transistor, and (b) said second and third electrodes of said switching device being said first and second base electrodes of said unijunction transistor.

12. The solid state switching apparatus as defined in claim 11 having a voltage divider connected between said anode and cathode of said silicon controlled rectifier and having a capacitor connected between an intermediate point on said voltage divider and the cathode of said controlled rectifier, said intermediate point of said voltage divider being connected to the emitter electrode of said unijunction transistor.

13. The solid state switching apparatus as defined in claim 10 including a tunnel diode, said tunnel diode having its anode connected to the gate electrode of said second controlled rectifier and having its cathode connected to the said cathode of said first silicon controlled rectifier.

14. The solid state switching apparatus as defined in claim 10 having a voltage divider connected between said anode and cathode of said first silicon controlled rectifier, said anode of said second silicon controlled rectifier being connected to an intermediate point on said voltage divider.

15. The solid state switching apparatus as defined in claim 14 having a capacitor connected between said intermediate point of said voltage divider and said cathode of said first silicon controlled rectifier.

16. The solid state switching apparatus as defined in claim 10 including a Zener diode having its anode connected to the cathode of said first controlled rectifier and its cathode connected to the anode of said second controlled rectifier.

References Cited by the Examiner

UNITED STATES PATENTS

| | | | |
|---|---|---|---|
| 3,088,409 | 5/1963 | Yavelberg | 307—88.5 |
| 3,126,516 | 3/1964 | Peaslea | 307—88.5 |
| 3,128,396 | 4/1964 | Morgan | 307—88.5 |
| 3,159,755 | 12/1964 | Duncan | 307—88.5 |
| 3,171,043 | 2/1965 | Peterson | 307—88.5 |
| 3,176,150 | 3/1965 | McMurray | 307—88.5 |
| 3,179,814 | 4/1965 | Stoudenmire | 307—88.5 |

OTHER REFERENCES

General Electric, Silicon Controlled Rectifier Manual, 2nd edition, 1961, pages 62–65 and 106 relied on.

Motorola, Silicon Zener Diode and Rectifier Handbook, 1961, pages 75–78 relied on.

General Electric, Tunnel Diode Manual, 1961, pages 48–49 relied on.

References Cited by the Applicant

UNITED STATES PATENTS

| | | |
|---|---|---|
| 3,241,043 | 3/1966 | Clarke. |
| 3,241,044 | 3/1966 | Mills. |

ARTHUR GAUSS, *Primary Examiner.*

I. C. EDELL, J. S. HEYMAN, *Assistant Examiners.*